United States Patent [19]

Jonsson et al.

[11] Patent Number: 4,750,085
[45] Date of Patent: Jun. 7, 1988

[54] CAPACITOR UNIT INCLUDING A PLURALITY OF CAPACITORS

[75] Inventors: Gerth R. Jonsson, Kalmar; Per A. P. Comstedt, Hägersten, both of Sweden; Gösta T. Hedqvist, San Francisco, Calif.; Arne J. Johansson, Kalmar, Sweden

[73] Assignee: Telefonaktiebolaget L M Ericsson, Stockholm, Sweden

[21] Appl. No.: 50,002

[22] PCT Filed: Sep. 12, 1986

[86] PCT No.: PCT/SE86/00409
§ 371 Date: Apr. 22, 1987
§ 102(e) Date: Apr. 22, 1987

[87] PCT Pub. No.: WO87/01863
PCT Pub. Date: Mar. 26, 1987

[30] Foreign Application Priority Data

Sep. 13, 1985 [SE] Sweden .................. 8504256

[51] Int. Cl.4 .................. H01G 4/38; H01G 7/00
[52] U.S. Cl. .................. 361/330; 29/25.42
[58] Field of Search .................. 361/328, 330, 275; 29/25.42

[56] References Cited

U.S. PATENT DOCUMENTS 3,093,775  6/1963  Lamphier ............... 361/330
3,993,967 11/1976  Saifi ..................... 361/275 X
4,170,812 10/1979  Rayno ................... 361/330 X

FOREIGN PATENT DOCUMENTS 90170 10/1983 European Pat. Off. ........... 361/330

Primary Examiner—Donald A. Griffin
Attorney, Agent, or Firm—Burns, Doane, Swecker & Mathis

[57] ABSTRACT

Capacitor unit including at least three capacitors (16-19) build up from alternate layers of metal and dielectric placed one above the other. The unit includes two insulation films (1, 2) rolled into a coil (9) one of said films being provided with two parallel first metal layers (3, 4) and the other with two second metal layers (6, 7) placed in tandem, both the latter bridging over both said first metal layers. Ore (7) of the second metal layers and both first metal layers (3, 4) are each provided with connection means (12-14) so that a delta circuit of the capacitors (16-19) is formed.

6 Claims, 1 Drawing Sheet

CAPACITOR UNIT INCLUDING A PLURALITY OF CAPACITORS

TECHNICAL FIELD

The present invention relates to a capacitor unit having at least three capacitors built up from metal and dielectric layers placed alternatively one on top of the other, comprising a capacitor unit including at least three capacitors built up from alternate layers of metal and dielectric placed one above the other, comprising two mutually electrically insulated first and second metal layers.

BACKGROUND ART

Electrical capacitors, particularly used as interference suppressors for attenuating noise voltages within the radio frequency range, are often manufactured in one unit by building up alternate layers of metal and dielectric placed one on top of the other. Such capacitor units may contain one, two or three capacitors, usually rolled into so-called capacitor coils. More recently, greater and greater demands have been placed on well-defined frequency properties in the capacitors. Furthermore, similar demands are made with regard to miniaturizing the units as well as fabricating them using automatic production techniques. So far, these demands have only been able to be realized in the fabrication of at most two capacitors in one and the same unit. In fabricating units with two capacitors the metal layers may namely be arranged in the form of metallization on the dielectric, since the electrical connections can be made by metallizing the end surfaces of the coil. Spot connections are therefore avoided while the units may be made very small and manufacture easily automated.

In the production of three capacitors in one and the same unit, the process has so far been that of covering the whole of one side of an elongate insulation film with a metallic film and applying three shorter metallic films at mutual spacing in the longitudinal direction of the insulating film on its other side, the unit then being rolled along its length into a capacitor coil. A capacitor is thus formed between each of the three shorter metallic films and the longer one. Since it is not possible to metallize the end surfaces of the coil in this case, each of the three shorter metallic films must be provided with an individual contact tab, which naturally places particular demands on material thickness and contact ability. Due to the dot contact which the connection tab gives, the frequency properties of these capacitors are deteriorated at the same time as the units will be voluminous and will furthermore not permit automated and cheap manufacture. The manufacturing method with metallization of the ends of the coil has per se been presented for example in EP A2 90170 but this method has given inferior results. The deep cuts made in the coil to part the conducting foils may produce short circuited layers and a burnt dielectric causing severe changes in the electrical data of the capacitor.

DISCLOSURE OF INVENTION

The object of this invention is therefore to provide a stable capacitor unit of the kind discussed in the introduction, which enables (a) making the unit smaller by the metallic layers being provided as metallizations on the dielectric, (b) obtaining a more elongate contact surface, (c) automatic manufacture, (d) cheaper manufacture due to less material consumption.

This object is achieved by the capacitor unit in accordance with the invention having been given the characterizing features disclosed in claim 1.

Further development of the invention is apparent from the subordinate claim.

BRIEF DESCRIPTION OF THE DRAWINGS

The invention will now be described in detail below with reference to the accompanying drawing illustrating a preferred embodiment of the invention.

BEST MODE FOR CARRYING OUT THE INVENTION

Figure 1:
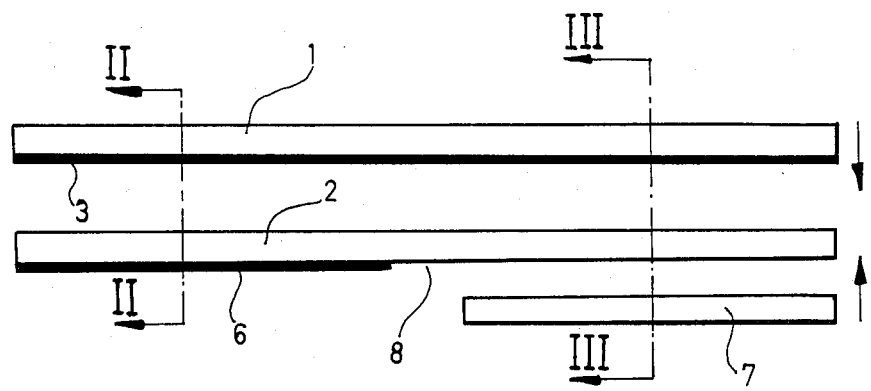
FIG. 1 is a side view of the components included in the capacitor unit in accordance with the invention before being put together.
Figure 2:
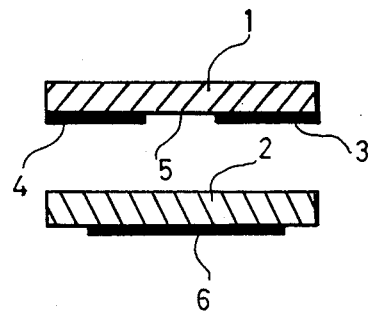
FIGS. 2 and 3 respectively illustrate cross sections along the lines II—II and III—III in FIG. 1.
Figure 3:
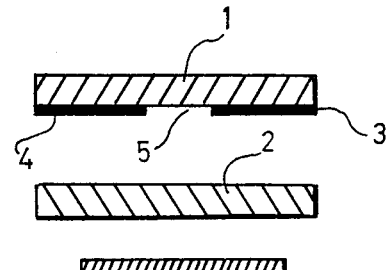

The capacitor unit according to FIG. 1 includes two dielectrics in the form of two mutually alike elongate insulation films 1 and 2. On one side the insulation film 1 has two mutually parallel first metallic layers in the form of two mutually electrically insulated coatings 3 and 4 extending in the longitudinal direction of the insulation film 1 along the entire length of the film and up to the respective longitudinal edges on the film. The sum of the widths of the coatings 3 and 4 is less than that of the insulation film 1, so that a central gap 5 is formed between the coatings. These coatings 3, 4 are suitably formed by metallizing the insulation film in a manner known per se.

The insulation film 2 which is intended to engage with its unmetallized side against the metallized side of the insulation film 1 has two other metal layers 6 and 7 on its side facing away from the insulation film 1, these two layers extending symmetrically from the respective short end of insulation film and towards the middle thereof. The length of the layers 6, 7 is selected such that a gap 8 is formed between them. Their width is less than the width of the insulation film so that they do not reach to the longitudinal edges of the insulation film, but so that they cover the gap 5 and at least partially bridge over the coatings 3 and 4.

Figure 4:
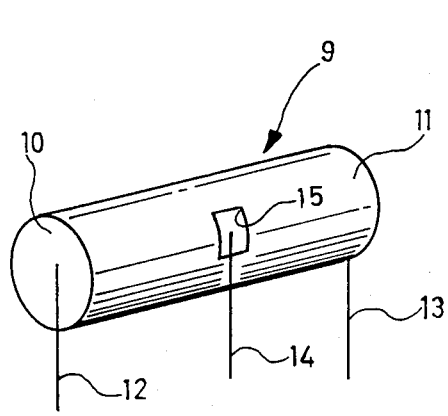
FIG. 4 illustrates the ready assembled capacitor units according to FIG. 1 rolled into a capacitor coil.

The metal layer 6 is suitably achieved by metallizing the insulation film 2, while the metal layer 7 is suitably a metal foil. The metallized insulation films 1 and 2 and the metal foil 7 are pressed against each other in the direction of the arrow and rolled along their length into several turns to form a capacitor coil 9, see FIG. 4. The coil 9 is therefore rolled up starting from the end to the left in FIG. 1 of the insulation films which have the metal layer 6. The metal foil 7 then finds itself in the outmost turn of the coil.

The end surfaces 10 and 11 of the coil 9 are each provided with an electrical contact means 12 and 13, e.g. in the form of a connection wire. The end surfaces 10 and 11, with the coatings 3 and 4 flush with them, are suitably provided with a sprayed-on tin lead alloy or the like for this purpose.

The metal foil 7 is also provided with an electric connection means 14, e.g. in the form of a connection wire. This is done in the illustrated embodiment by a groove 15 being made through several turns of the metal foil 7, the groove then being filled with a suitable contact medium, e.g. by spraying the groove with metal.

The groove 15 in the coil 9 and the connection 14 to the metal foil 7 are made such that a sufficient number of turns obtain contact.

A particular advantage with the invention is that it is possible to allow the metal foil 7 to go outside the winding 9 (if the other film is demetallized) thus obtaining effective moisture protection for the entire capacitor unit.

Figure 5:
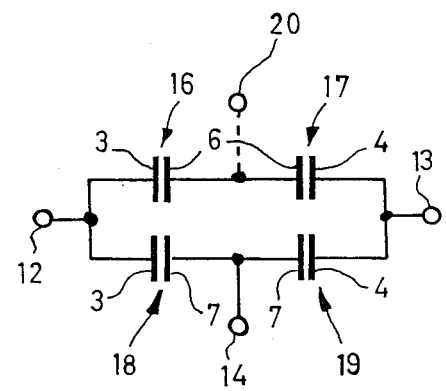
FIG. 5 is an electrical equivalent circuit for the capacitor unit according to FIG. 1.

The connection means 12, 13 and 14 form the three corner terminals in a delta circuit including the capacitors 16–19 as will be seen from the equivalent connection circuit in FIG. 5.

The metal layer 6 forms one coating in the capacitors 16 and 17, the other coatings of which are formed by the metal coatings 3 and 4. In a corresponding manner, the metal foil 7 forms one coating in the capacitors 18 and 19, the other coatings of which are formed by the metal coatings 3 and 4. The series-connected capacitors 16 and 17 thus form together the capacitor of the one branch in the delta circuit, while the other capacitors 18 and 19 each form the remaining branches in the delta connection.

If, in addition, the metal coating 6 is provided with a connection 20, as indicated by a dashed line, there is thus obtained a bridge connection of the four capacitors 16–19.

We claim:

1. A capacitor unit including at least three capacitors built up from alternate layers of metal and dielectric placed one above the other, comprising two mutually electrically insulated first and second metal layers arranged side by side and oriented in a predetermined direction, and a third metal layer oriented in said direction, said third metal layer partially bridging over said first and second metal layers, said capacitor unit being rolled a plurality of turns to form a capacitor coil, the end surfaces of said capacitor coil being metallized and provided with electrical connecting means and each connected with said first and second metal layers, characterized in that said third metal layer is divided into two electrically separated metal layers arranged in sequence in said predetermined direction, each of said separated layers bridging at least partially said first and second metal layers so that each of said separated metal layers is capacitively coupled to said first and second metal layers, one of said separated metal layers forming a number of outer turns of the capacitor coil, with said other separated metal layer being located inwardly of said one separated metal layer, said coil being provided with a groove through said number of outer turns, and an electrical connecting member being located in said groove to provide contact with said one separated metal layer which forms said number of outer turns.

2. Capacitor unit as claimed in claim 1, characterized in that said one separated metal layer comprises a metal foil, while the remaining metal layers comprise metallizations on said dielectric.

3. A capacitor unit including at least three capacitors formed from alternate layers of metal and dielectric placed one above the other comprising:

two mutually electrically insulated first and second metal layers, said first and second metal layers being arranged in side-by-side, spaced relation to each other with a centrally extending space between said first and second metal layers, said first and second metal layers being oriented in a predetermined direction, third and fourth electrically separated metal layers arranged in sequence and in spaced relation to each other to form a gap between said separated metal layers with said gap being oriented in a transverse direction to said centrally extending space, said third and fourth separated metal layers bridging at least partially said first and second metal layers so that each of the third and fourth separated metal layers is capacitively coupled to the first and second metal layers, said metal layers being in rolled form to provide a capacitor coil having a plurality of turns, and further including electrical connecting means on the end surfaces of said capacitor coil to provide contact with said first and second metal layers, wherein one of said separated metal layers forms a number of outer turns of said capacitor coil with said capacitor coil being provided with a groove through said number of outer turns, and with said other separated metal layer being located in a number of inner turns of said capacitor coil, and an electrical connecting member located in said groove to provide contact with said one separated metal layer forming said number of outer turns of said capacitor coil.

4. The capacitor unit as claimed in claim 3, wherein said separated metal layer forming said number of outer turns of said capacitor coil includes the outermost turn of said capacitor coil.

5. The capacitor unit as claimed in claim 4, wherein said other separated metal layer is located inwardly of said one separated metal layer forming said number of outer turns and said outermost turn of said capacitor coil.

6. A method of forming a capacitor coil from a capacitor unit including at least three capacitors built up from alternate layers of metal and dielectric placed one above the other, comprising the steps of:

providing a first electrically insulated metal layer oriented in a predetermined direction, providing a second electrically insulated metal layer oriented in said predetermined direction and arranged in side-by-side, spaced relation to said first electrically insulated metal layer to form a centrally extending space between said first and said second electrically insulated metal layers, providing a third metal layer having a first electrically separated metal layer and a second electrically separated metal layer, with said first and said second electrically separated metal layers being in tandem, spaced relation to each other to form a gap between said first and said second electrically separated metal layers, with said gap being arranged in a transverse direction to said centrally extending space, and with said first and said second electrically separated metal layers bridging at least partially said first and said second metal layers so that each of said separated metal layers is capacitively coupled to said first and said second metal layers, rolling said capacitor unit including said first, second and third metal layers a plurality of turns to form a capacitor coil such that one of said first and said second separated metal layers forms a number of outer turns of said capacitor coil, and said other separated metal layer is located in the inner turns of said capacitor coil and inwardly of said one separated metal layer which forms said number of outer turns,
forming a groove through said number of outer turns of said capacitor coil,
providing an electrical connecting member in said groove and in contact with said one separated metal layer forming said number of outer turns of said capacitor coil,
metallizing the end surfaces of said capacitor coil, and
providing said metallized end surfaces of said capacitor coil with electrical connecting means for connection with said first and said second metal layers.

* * * * *